Figure 1:
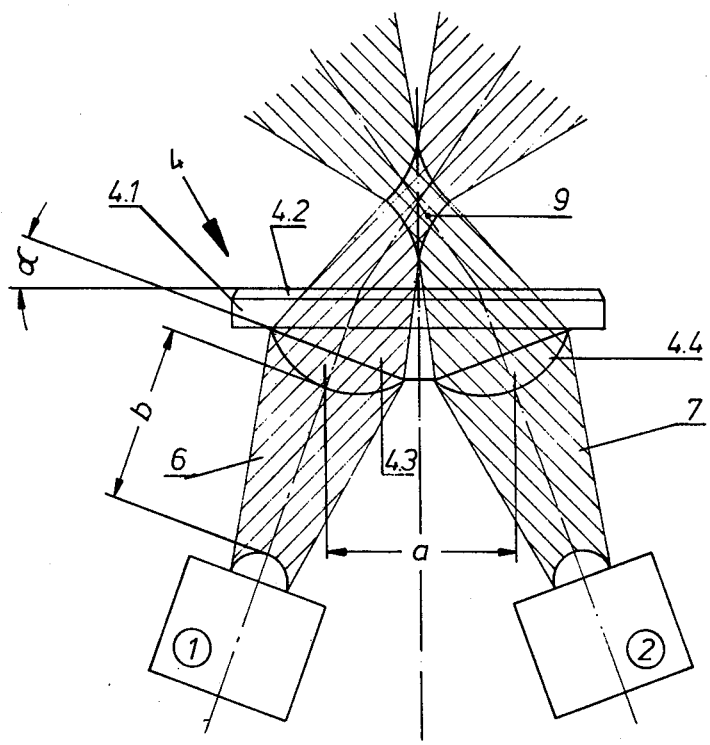

United States Patent

Fetzer

[11] 4,044,250
[45] Aug. 23, 1977

[54] DEVICES FOR DETECTING THE PRESENCE OF AN OBJECT IN A MONITORED REGION

[76] Inventor: Gunter Fetzer, Gundelfingen, Germany

[21] Appl. No.: 624,181

[22] Filed: Oct. 20, 1975

[30] Foreign Application Priority Data

Nov. 28, 1974 Germany .............................. 2456248

[51] Int. Cl.² .......................... H01J 3/14; H01J 5/16; H01J 39/12
[52] U.S. Cl. .................................. 250/216; 250/560; 350/193; 350/107; 250/571
[58] Field of Search ............... 250/561, 571, 578, 216, 250/572, 568, 239, 574; 356/114, 209; 350/193, 107

[56] References Cited

U.S. PATENT DOCUMENTS

| | | | |
|---|---|---|---|
| 2,866,279 | 12/1958 | Surber | 250/239 |
| 2,923,827 | 2/1960 | Dessauer et al. | 250/239 |
| 2,973,686 | 3/1961 | Dreyfus et al. | 250/560 |
| 3,421,013 | 1/1969 | Angelari | 250/239 |
| 3,509,353 | 4/1970 | Sundblad et al. | 250/239 |
| 3,519,833 | 7/1970 | Arch et al. | 250/561 |
| 3,553,470 | 1/1971 | Dench | 250/239 |
| 3,639,770 | 1/1972 | Zizelmann | 250/574 |
| 3,667,846 | 6/1972 | Nater et al. | 250/572 |
| 3,880,528 | 4/1975 | Petersen et al. | 250/239 |

*Primary Examiner*—Archie R. Borchelt
*Assistant Examiner*—David K. Moore
*Attorney, Agent, or Firm*—Cushman, Darby & Cushman

[57] ABSTRACT

A device for detecting the presence of an object in a region to be monitored of the kind comprising light emitting means, electronic light receiving means, and an optical system having means for focussing the light emitted by the light emitting means and means for focussing any light reflected by an object in the monitored region and passing to the light receiving means. The respective focussing means, which are preferably incorporated in a common block moulded from a light permeable material such as glass or plastics material, are so arranged relative to one another that the path of the light rays from the light emitting means and the path of any light rays passed to the light receiving means meet at an angle to one another in the region to be monitored.

17 Claims, 6 Drawing Figures

U.S. Patent  Aug. 23, 1977  Sheet 3 of 3  4,044,250

DEVICES FOR DETECTING THE PRESENCE OF AN OBJECT IN A MONITORED REGION

The present invention relates to devices for detecting the presence of an object in a monitored region.

One field of application of devices of the kind aforesaid is for determining in printing machines (for printing paper) whether a sheet of paper has been advanced to a required position. In such an application two devices of the kind aforesaid can be arranged close one behind the other to provide a so-called optical stop so that when the device whose monitored region is first reached by a sheet signals that the sheet has arrived and the other device signals that it has not arrived, it will be apparent that the edge of the sheet is situated between the two monitored regions.

Such devices may also be used in other technical fields, for example in the machining of workpieces of any kind on e.g., a milling machine. The machine can then be controlled automatically in accordance with a predetermined plan, the device giving a control signal when a workpiece has reached a required position.

Devices for detecting the presence of an object in a monitored region are known which work on the principle of autocollimation, that is to say with a parallel light beam deflected into itself. They thus have a practically infinite depth of sharpness which, however, for many applications is not necessary. In addition, these devices are so large that it is difficult to accommodate them in the frame of a printing machine or other processing machine. Moreover it is not possible for two of them to be disposed so close one behind the other that the monitored regions are spaced apart from one another by, for example, say 4 mm, which is necessary if an optical stop is to be provided. Finally, such known devices are expensive.

Devices for detecting the presence of an object are also known which have no optical system. Such devices have no defined monitored region at all. The distance from the light emitter at which an object can still be detected by the device largely depends on the nature of the surface of the object since the device will detect an object having a reflective surface at a substantially greater distance than, e.g., a black object having a less reflective surface.

The present invention therefore seeks to provide a device for detecting the presence of an object which will enable objects to be detected in a geometrically strictly defined monitored region, independently of the nature of the surface of the object.

The present invention provides a device for detecting the presence of an object in a region to be monitored, comprising light emitting means, electronic light receiving means, and an optical system comprising means for focussing the light emitted by the light emitting means and means for focussing any light reflected by an object in the monitored region and passing to the light receiving means, said respective focussing means being so arranged relative to one another that the path of the light rays from the light emitting means and the path of any light rays passed to the light receiving means meet at an angle to one another in the region to be monitored.

Through the two focussing means two geometrically defined light paths are obtained which obliquely penetrate one another. The zone where the two light paths penetrate one another is the monitored region within which objects can be detected independently of the nature of their outside surfaces. No objects outside the monitored region will be detected.

The two respective focussing means may be incorporated in a common block of material which is permeable to light. In this way the device can be accommodated in a particularly small space and can be produced at low cost, particularly if, as is preferred, the block is a moulding of plastics material or glass.

The block may have a plane surface on one side thereof and lens portions whose optical axes intersect, on the opposite sides thereof.

Said lens portions of the block may have partspherical surfaces or may have aspherical surfaces, e.g., part-cylindrical or toric surfaces. Only the plane surface need in fact be optically machined.

If desired the block may comprise focussing means for at least one further light emitting means and at least one further light receiving means, so enabling, for example, an optical stop to be provided in a particularly convenient and compact manner.

A device having an optical system will only be able to work at optimum efficiency while the optically active surfaces thereof are not excessively soiled. When used in printing machines, for example, the optical surfaces may be soiled by splashes of printing ink, and in other machines by splashes of dirty oil, grinding dust, metal chips, sawdust, or other foreign matter.

According to a preferred embodiment, the device of the present invention comprises a casing which contains the light emitting means and the light receiving means and which is airtightly and watertightly closed by said block so that only a plane surface of the block is exposed. With this arrangement all optically active surfaces other than said exposed plane surface are accommodated airtightly and watertightly inside the casing and accordingly cannot become soiled. It is simply necessary to clean the exposed plane surface from time to time.

The airtight and watertight arrangement also helps to prevent condensation from forming inside the casing, and particularly on the optical surfaces, in the event of thermal shock.

The block may comprise lens portions and a plate-like portion which overhangs the lens portions to provide a supporting shoulder. The casing may comprise an outwardly extending flange portion with which said shoulder cooperates and sealing means may be interposed between the flange portion and the shoulder.

Figure 2:
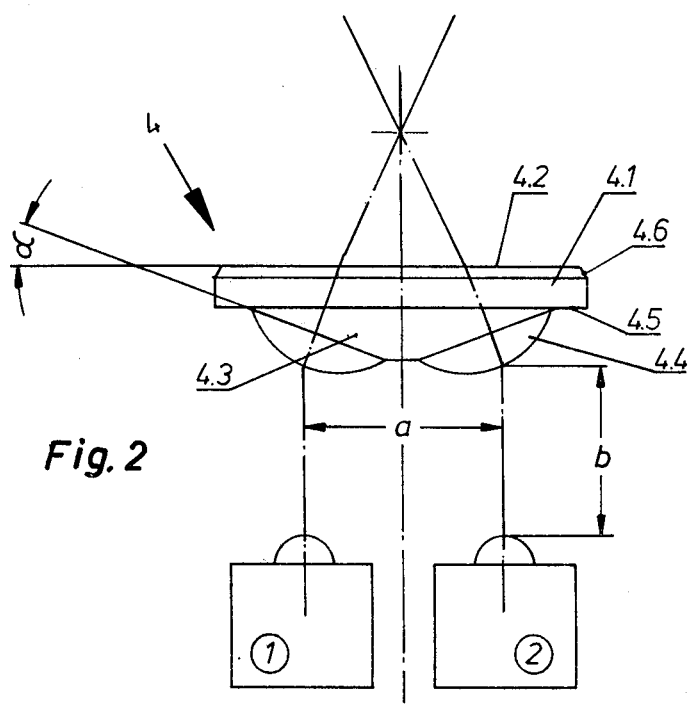
Figure 3:
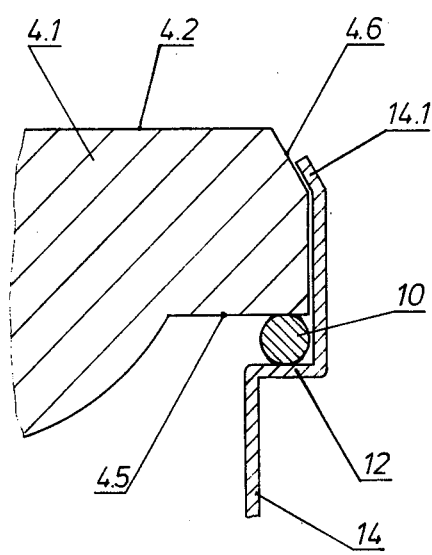
Figure 4:
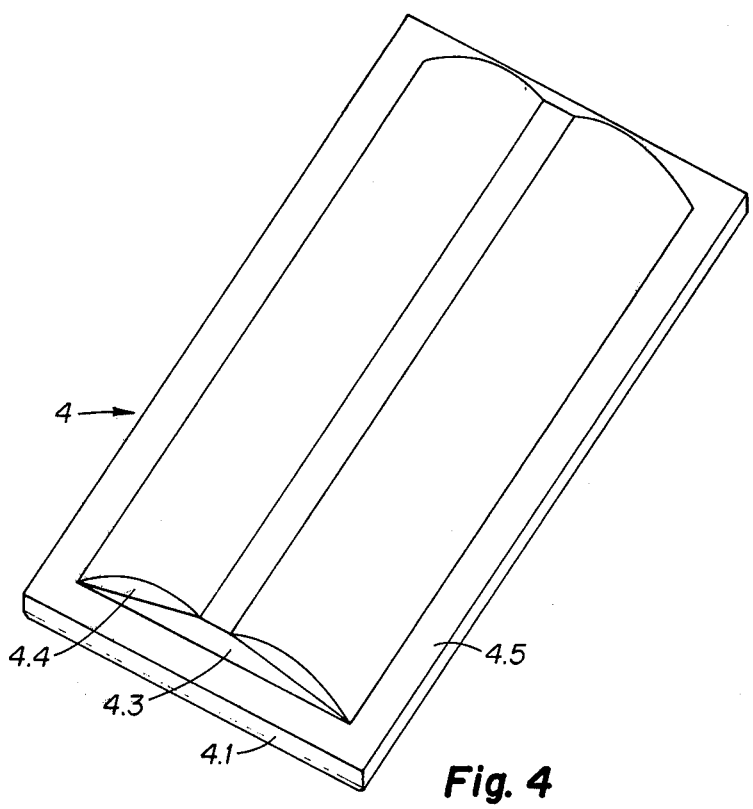
Figure 5:
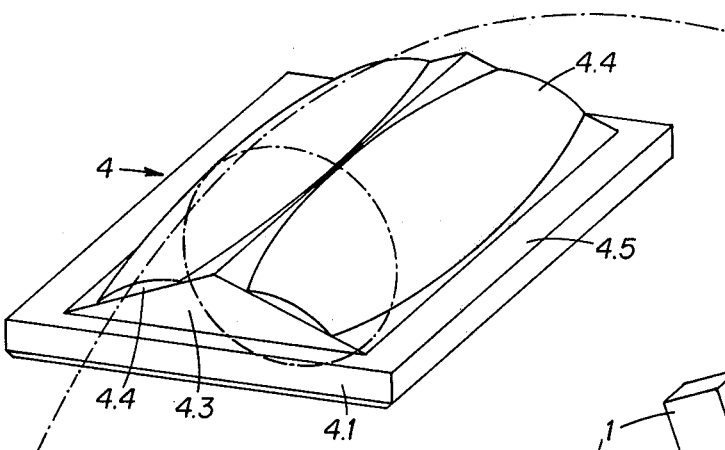
Figure 6:
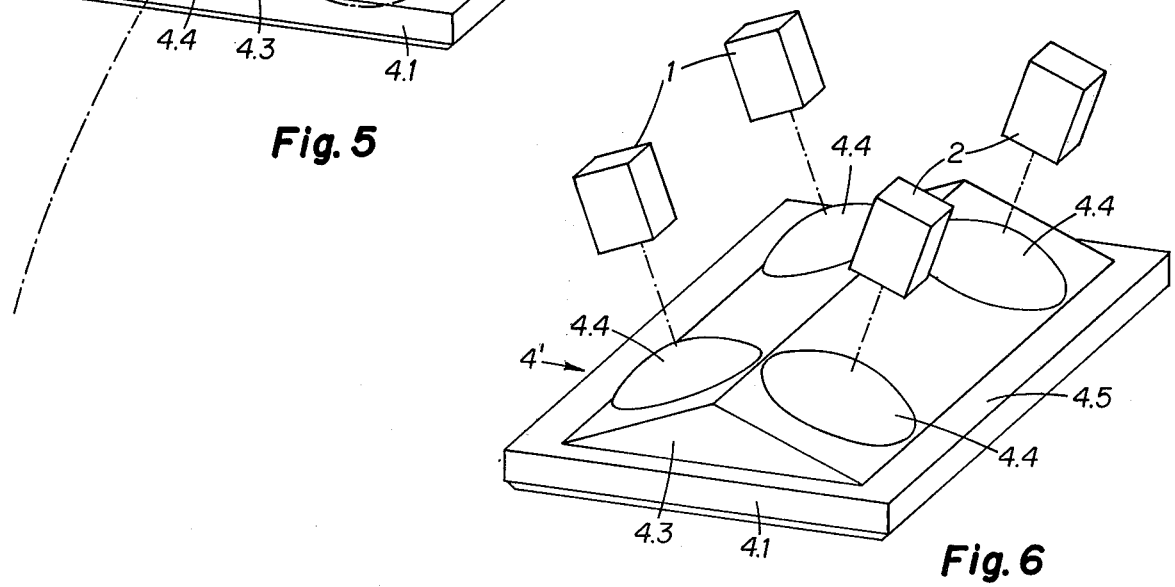

The invention will be further described with reference to the accompanying drawings, in which:

FIGS. 1 and 2 are diagrammatic side views of two different devices according to the present invention, FIG. 3 is a partial longitudinal section showing part of the optical system and casing of a device according to FIG. 1 or FIG. 2, FIG. 4 is a perspective view of an optical block with part-cylindrical lens portions according to this invention, FIG. 5 is a perspective view of another optical block with toric lens portions according to this invention, and FIG. 6 is a perspective view of a still further optical block with dual sets of lens portions and transmitters and receivers.

The devices shown in FIGS. 1 and 2 each comprise a light emitter 1 and an electronic light receiver 2. According to FIG. 1, the light emitter 1 and the light receiver 2 are disposed at an angle to one another, and in accordance with FIG. 2 they are disposed parallel to one another. The light emitter may be a gallium arsenide diode, and the light receiver a phototransistor. However, an incandescent lamp or other suitable light source may also be used as the light emitter.

The devices of FIGS. 1 and 2 further comprise an optical system having means for focussing the light emitted by light emitter 1 and means for focussing any light passing to the light receiver 2. The optical system is incorporated in a block 4 which is moulded from a material permeable to light, for example glass. Block 4, therefore, consists essentially of transparent optically refractive material, and cannot be readily disassembled or disadjusted. The individual components of the block, which are firstly combined into a unitary structure, and a plate-like portion 4.1. of which the plane surface 4.2. lying uppermost in FIGS. 1 and 2 is the only part requiring optical machining. On the side of the plate-like portion opposite to the plane surface 4.2 is a roof-shaped portion 4.3 which supports two lens portions 4.4 so that the optical axes of the lens portions 4.4 extend obliquely with respect to one another. FIG. 1 shows two imaginary lobes 6 and 7, which intersect one another in a geometrically strictly defined monitored region 9. The lobe 6 corresponds to the path of the light rays by the light emitter 1 whilst the lobe 7 corresponds to the path of any light rays reflected by an object in the monitored region 9 and passing to the light receiver 2, the lobes 6 and 7 having been projected beyond the monitored region 9.

If the light emitter 1 comprises a point source of light and if it is desired to have a monitored region 9 the dimensions of which in the plane of the drawings and at right angles to that plane are approximately equal in size, the lens portions 4.4 will be part-spherical. If, on the other hand, it is desired to have a monitored region 9 which is elongated transversely of the plane of the drawings, the lens portions 4.4 will be part-cylindrical as in FIG. 4, in which case the light emitter 1 may comprise an elongated spiral incandescent lamp.

Intermediate forms of monitored region 9 can be obtained by using toric lens portions 4,4 as in FIG. 5, that is to say lens portions whose curvature (e.g., per the small radius dash-dotted line circle) in a plane at right angles to the plane of the drawings is less than that (e.g., per the long radius dash-dotted fractional circular line) in the plane of the drawings.

Depending upon the field of application of the device, the monitored region 9 will need to be at a greater or smaller distance from the plane surface 4.2. This can be achieved by suitably selecting the roof angle α of the roof-shaped portion 4.3. and the distance $a$ between the centres of the lens portions 4.4. The size of the monitored region 9 can be determined by suitable selection of the distance $b$ between the outer surfaces of the lens portions 4.4 on the one hand and the light emitter 1 and light receiver 2 on the other hand, and also by suitably sizing emission and reception apertures of the light emitter 1 and light receiver 2.

Through the strict delimitation of the monitored region 9 it is ensured that only objects situated in this region will be detected. Objects outside this region, and particularly on the side of this region remote from the plane surface 4.2., will not be detected even if they have a reflecting surface.

The block 4 is so constructed that it can be accommodated, in the manner of a glass plate, airtightly and watertightly in a casing, for example in a cup-shaped casing which is open at one side. As will be seen from FIG. 3, the plate-like portion 4.1 of the block 4 overhangs lens portions 4.4 to form a supporting shoulder 4.5 which rests on an outwardly extending flange 12 of the casing 14 and a sealing O-ring 10 is interposed between the shoulder 4.5 and the flange 12. The outer margin 14.1 of the casing is swaged over against a peripheral bevel 4.6 of the plate-like portion 4.1 to retain the block 4 in the casing. The light emitter 1 and the light receiver 2 will, of course, be contained within the casing 14.

Accordingly, as to the optically active surfaces (which obviously excludes any exposed portion of bevel 4.6), only the plane surface 4.2 of the block 4 is exposed and can become soiled and only this surface therefore will need to be cleaned from time to time.

If it is desired to have two or more devices according to the invention closely adjacent one another, for example in order to form an optical stop, then the block 4' as in FIG. 6 can be provided with focussing means for one or more additional light emitters 1 and one or more additional light receivers 2 so as, in effect, to incorporate two or more devices in one. In this way the distance between the monitored regions of the two or more devices can be very greatly reduced.

What is claimed is:

1. A device for detecting the presence of an object in a region to be monitored, comprising:
   light emitting means,
   electronic light receiving means, and
   an optical system comprising means for focussing the light emitted by the light emitting means into a bundle of light rays and means for focussing any bundle of light rays reflected by an object in the monitored region and passing same to the light receiving means,
   said respective focussing means being so arranged relative to one another that the bundle of the light rays from the light emitting means and the bundle of any light rays passed to the light receiving means meet at an angle to one another to define said object region exclusively at the intersection of the most constricted cross-section areas of both said light ray bundles,
   said respective focussing means being fixedly incorporated in a common block which is a nonreadily disassemble and disadjustable unitary structure consisting essentially of transparent optically refractive material which is permmeable to light,
   wherein said block has a plane surface as one side thereof and its opposite side includes as at least part of said focussing means two respective lens portions whose optical axes are both at an oblique angle relative to said plane surface and convergingly extend through said block for intersection at a predetermined distance outward from said plane surface at least near the center of said object region.

2. A device according to claim 1, wherein said block is a moulding of glass or plastics material.

3. A device according to claim 1, wherein the block has a plane surface on one side thereof and lens portions, whose optical axes intersect, on the opposite side thereof.

4. A device according to claim 1, wherein said block comprises lens portions having part-spherical surfaces.

5. A device according to claim 1, wherein said block comprises lens portions having aspherical surfaces.

6. A device according to claim 5, wherein said block comprises lens portions having part-cylindrical surfaces.

7. A device according to claim 5, wherein said block comprises lens portions having toric surfaces.

8. A device according to claim 1, wherein said block comprises focussing means for at least one further light emitting means and at least one further light receiving means.

9. A device according to claim 1, comprising a casing which contains the light emitting means and the light receiving means and which is airtightly and watertightly closed by said block so that only a plane surface of the block is exposed.

10. A device according to claim 1, comprising a casing an open side of which is closed by said block, the block having lens portions and a plate-like portion which overhangs the lens portions and provides a supporting shoulder whereby the block is supported in the casing.

11. A device according to claim 1, commprising a casing an open side of which is closed by said block, the casing having an outwardly extending flange portion and the block having lens portions and a plate-like portion which overhangs the lens portions and provides a supporting shoulder which cooperates with the flange portion, sealing means being interposed between the said shoulder and the said flange portion.

12. A device as in claim 1 wherein said common block is an integral unitary structure.

13. A device as in claim 1 including means for strictly delimiting said object region to ensure that only an object situated in said region is detected.

14. A device as in claim 1 wherein said predetermined distance between said object region center and said plane surface is effected by said lens portions being disposed with their said optical axes (a) extending at equal predetermined angles relative to said plane surface and (b) separated a given distance as measured on said opposite side parallel to said plane surface.

15. A device as in claim 14 having means determining the size of said object region including the outer surfaces of said lens portions being respectively disposed a given distance from said light emitting and receiving means.

16. A device as in claim 1 including a casing airtightly and watertightly enclosing all of said light emitting and receiving means and all of said block with the exception of substantially only said plane surface.

17. A device as in claim 1, wherein said plane surface is optically machined and is the only part of said block that is optically machined.

* * * * *